April 18, 1961 R. R. GUNDERSON 2,980,375
FOLDABLE WARNING SIGNAL
Filed April 10, 1958 3 Sheets-Sheet 1
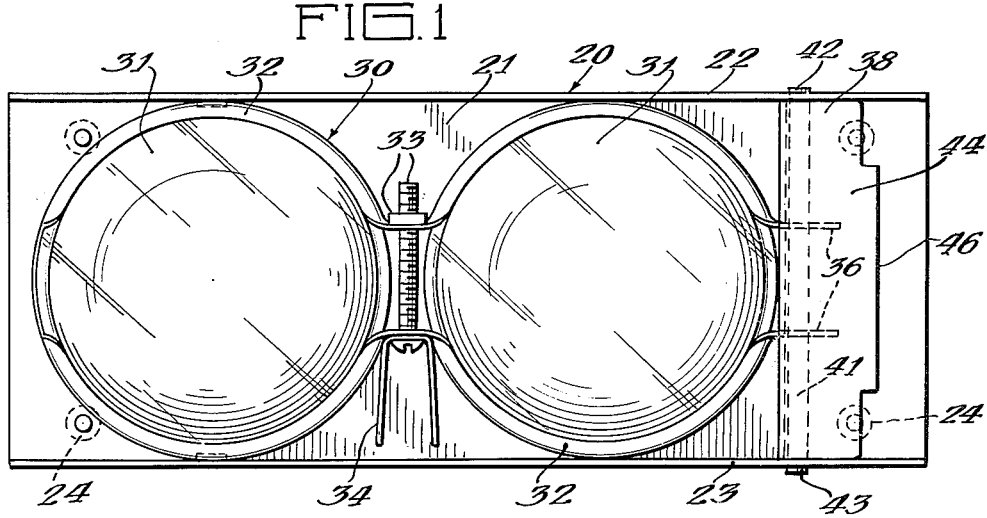
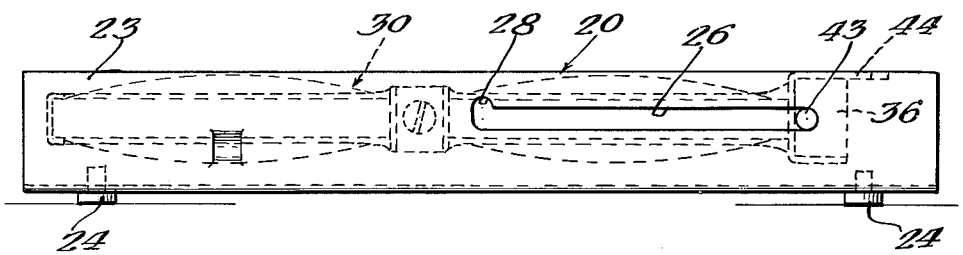
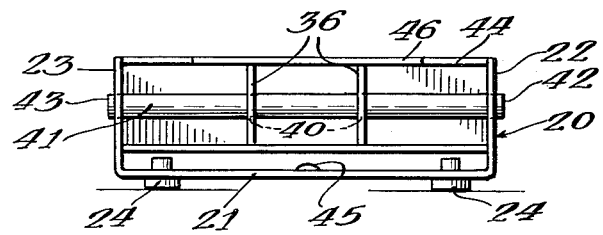
Inventor:
Ralph R. Gunderson
By: Schroeder, Hofgren,
Brady & Wegner
Attorneys

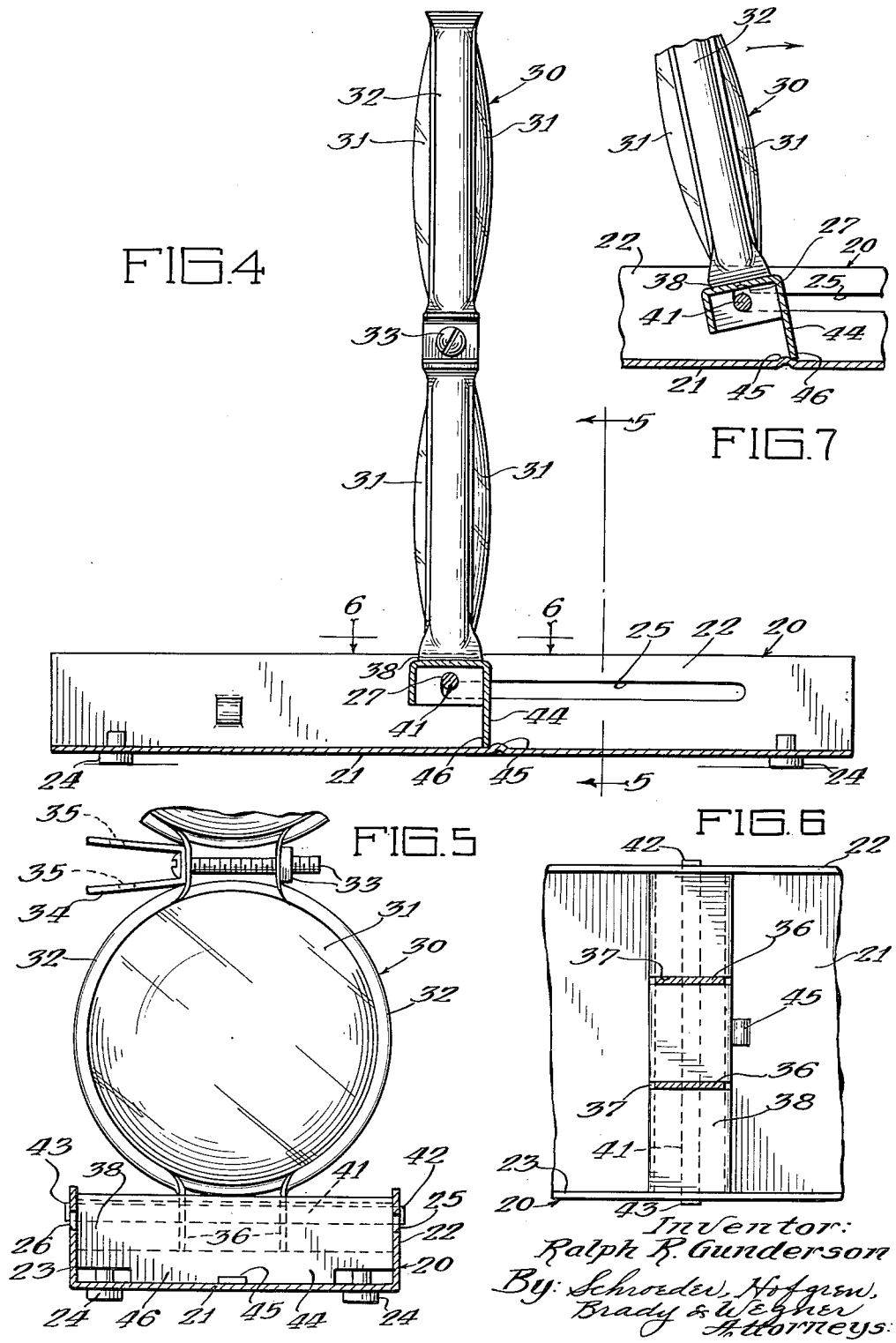

April 18, 1961   R. R. GUNDERSON   2,980,375
FOLDABLE WARNING SIGNAL
Filed April 10, 1958   3 Sheets-Sheet 3
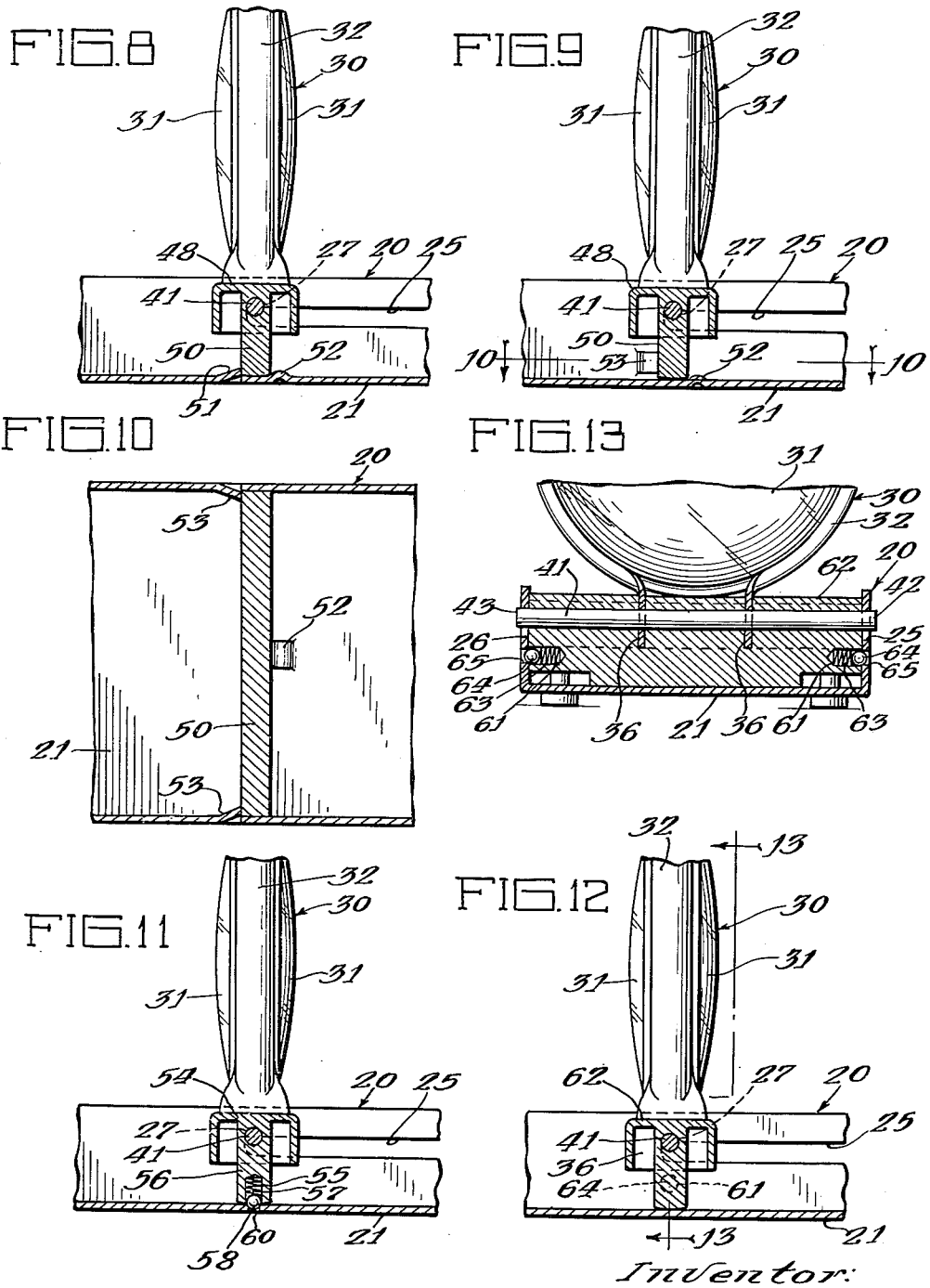

United States Patent Office 2,980,375
Patented Apr. 18, 1961

2,980,375
FOLDABLE WARNING SIGNAL
Ralph R. Gunderson, 5520 South Shore Drive, Chicago, Ill.
Filed Apr. 10, 1958, Ser. No. 727,714
8 Claims. (Cl. 248—33)

This invention relates to a foldable warning signal of the type commonly carried by vehicles for use on highways during an emergency to warn approaching traffic of the existence of a dangerous condition, and more particularly, to a unique latching mechanism for such a warning signal for maintaining the signal in upright operative position and permitting it to be folded into closed position when not in use.

Foldable warning signals have been in use for some time, for example, see Gunderson Patent 2,757,891 which issued August 7, 1956. The present invention utilizes a unique latching structure which completely eliminates the connecting links of the former structure and makes it unnecessary to perform any riveting operations during assembly. Manufacture of the device is thus reduced primarily to a stamping operation, the device being made in two main structural portions which are simply snapped together to form the completed unit.

The primary object of the present invention is to provide a new and improved foldable warning signal to be carried by vehicles on the highway.

Another object is to provide a unique latching mechanism in combination with journal slides which permits the warning signal to be releasably latched in open position and swung to closed position when not in use.

A further object is to provide a foldable warning signal having cooperating latching portions acting between the signaling device and its supporting frame, the latching portions holding the journals of the signaling device in their journal seats and releasably maintaining the signaling device in upright open position.

Yet another object is to provide a unique manner of mounting a clamping strip and journal bar to hold the lenses in assembled relation and afford swinging movement to the signaling device.

Another object is to provide a simple and durable foldable warning signal which is particularly well adapted for manufacture on a mass production basis.

The invention is illustrated in a preferred embodiment in the accompanying drawings, in which:

Fig. 1 is a top plan view of a warning signal with the signaling device in retracted closed position;

Fig. 2, a side elevational view of the warning signal of Fig. 1 showing the signaling device in dotted outline;

Fig. 3, an end elevational view taken from the right of Fig. 2;

Fig. 4, a side elevational view showing the signaling device latched in upright open position;

Fig. 5, a fragmentary sectional view taken as indicated on line 5—5 of Fig. 4;

Fig. 6, a fragmentary sectional view taken as indicated on line 6—6 of Fig. 4;

Fig. 7, a fragmentary sectional view showing the signaling device just before being latched in upright open position during movement as indicated by the arrow and with the journals not yet forced upwardly into the journal seats;

Fig. 8, a fragmentary sectional side elevational view with some parts in section of a modified showing of the warning signal with the signaling device in upright open position and held between a stop member and latching portion on the base;

Fig. 9, a fragmentary sectional side elevational view with some parts in section of a modified showing of a further embodiment of the warning signal somewhat similar to the structure shown in Fig. 8, but having the stops arranged on the side walls of the frame of the device;

Fig. 10, a sectional view taken as indicated on line 10—10 of Fig. 9;

Fig. 11, a fragmentary side elevational view with some parts in section of a fourth embodiment of the warning signal showing a further mechanism for latching the signaling device in upright open postion;

Fig. 12, a fragmentary side elevational view with some parts in section of a fifth embodiment of the warning signal showing yet another latching mechanism for holding the signaling device in upright open position; and Fig. 13, a sectional view taken as indicated on line 13—13 of Fig. 12.

In the preferred embodiment illustrated, and referring particularly to Figs. 1 through 7, a supporting frame, generally designated 20, and preferably of metal, is formed into channel shape by bending to provide a base 21 and a pair of upstanding opposed side walls 22 and 23. The base 21 is preferably perforated in its corner portions to receive a number of rubber elements 24 upon which the frame 20 is supported when the warning signal is in operative position. Side walls 22 and 23 are each provided with a similar journal slide, preferably in the form of longitudinally extending slots 25 and 26, respectively, which have at their ends upwardly offset journal seats 27 and 28, respectively.

The signaling device, generally designated 30, has two pairs of plastic reflecting lenses 31. The lenses of each pair are arranged back-to-back, and the sets are held in spaced relation by a continuous curved metal clamping strip 32 embracing portions of the periphery of each of the sets of lenses 31. The strip 32 may be drawn together between the sets of lenses by a bolt and nut 33 which also anchors a U-shaped sheet metal bracket 34 to the signaling device 30. The bracket 34 is preferably apertured at 35 in each of its arms to receive the supporting stem of a signal flag, not shown.

The strip 32 has a pair of free end portions 36 each of which is snugly received within one of a pair of slots 37 in a transverse crossbar 38 to hold the lower end of the clamping strip 32 in embracing relationship about the lower set of lenses 31. As seen in Fig. 3, the free end portions 36 are preferably apertured as at 40 so as to snugly and frictionally receive a journal bar 41 passing therethrough. The journal bar 41 thus supports the crossbar 38 on the frame 20, and, in addition, anchors the strip 32 and lenses 31 in position on the crossbar 38. The crossbar 38, the journal bar 41 and the free end portions 36 form a lower end assembly of the signaling device 30.

As best shown in Fig. 4, the crossbar 38, preferably formed of sheet metal, is bent so that it has an L-shaped configuration in section. The crossbar may be formed to extend across the base 21 of the frame 20 between the side walls 22 and 23, and is of such length as to permit the opposite journal bar ends 42 and 43 to protrude outwardly beyond its end portions into the slots 25 and 26.

The crossbar 38 preferably has a downwardly extending leg or end portion 44 which is positioned rearwardly of the axis of the journal bar 41 when the signaling device 30 is in upright operative position. The leg 44 is of such length that its free end portion 46 swings in an arc intersecting the base of the channel, as shown in Figs. 4 and 7, to arrest clockwise movement of the signaling device 30 in upright position.

In order to maintain the signaling device 30 in upright position, a pair of cooperating latching portions are provided which act between the frame 20 and the crossbar 38 to retain and lock the signaling device in upright position. In the embodiment illustrated in Figs. 1 through 7, the latching portion on the frame is provided by an inwardly struck detent 45 stamped into the base 21, while the free end portion 46 forms a cooperating latching portion in the crossbar 38.

When the signaling device 30 is swung clockwise as shown in Fig. 7, the free end portion 46 of the crossbar 38 initially strikes the detent 45. Further clockwise movement of the signaling device causes the end portion 46 and the crossbar 38 to be cammed upwardly so that the journal ends 42 and 43 enter the journal seats 27 and 28 and permit the end portion to ride over the detent 45. The base 21 is also preferably slightly resilient which allows the end portion 46 to snap past the detent 45 into latched position. The journal ends 42 and 43 are held in the journal seat by the latching detent 45 and because of the fact that the end portion 46 of the crossbar rests firmly in abutting contact against the base 21. As shown in Fig. 4, the signaling device 30 cannot be rotated farther in a clockwise direction because such rotation carries the end portion 46 in a downward direction into abutting relation with the base 21.

In order to return the signaling device 30 to retracted closing position (Fig. 2) within the frame 20, it is merely necessary to grasp the signaling device 30 in open position (Fig. 4) and rotate it in a counterclockwise direction so that the cooperating latching portions, 45 and 46, are sprung apart. This permits the journal ends 42 and 43 to ride downwardly out of the journal seats 27 and 28 and into the journal slides or slots 25 and 26. The journal ends 42 and 43 may then be slid rearwardly in the slots 27 and 28 to the position shown in Fig. 2 so that the signaling device 30 can be rotated downwardly between the side walls 22 and 23 within the frame 20.

In manufacturing the device, it is apparent that the frame 20 may be appropriately cut out to form the slots 25 and 26 and the journal seats 27 and 28. The frame can then be formed into its channel-shaped configuration by a simple stamping operation which forms the base 21 and the side walls 22 and 23. The signaling device 30, the crossbar 38, and its journal bar 41 can then be assembled into a second unit. In order to place this second unit in operative relation with the frame 20, it is merely necessary to snap the journal ends 42 and 43 into the slots 25 and 26 of the frame 20. The arrangement of parts into two major components and the unique latching structure make this warning signal particularly simple and inexpensive to make and assemble.

A second embodiment of the invention is illustrated in Fig. 8 in which the signaling device 30 is provided with a slightly different crossbar 48 on which the journal bar 41 is mounted. The crossbar 48 may be formed generally T-shaped in cross section and has an end portion 50 which is of a length to swing in an arc substantially tangentially to the base 21 of the frame 20. While the general operation of the device is as described above, the latching portions cooperate to hold the signaling device upright in a slightly different manner.

The base 21 is preferably provided with an upwardly struck stop member 51 which is adapted to bear against the end portion 50 and stop the signaling device 30 in upright position, as shown in Fig. 8. The detent or latching portion 52 is struck upwardly from the base 21 of the frame 20 slightly rearwardly of the stop member 51. Thus when the signaling device is swung toward upright operative position, the end portion 50 bears initially against the detent 52 and cams the journal ends 42 and 43 upwardly into the journal seats 27 and 28, in a manner previously described, so that the end portion is permitted to pass forwardly of the detent 52 and rest against the stop member 51, as shown in Fig. 8.

In this embodiment, the stop member 51 and the detent 52 are spaced to receive the end portion 50 of the crossbar 48 between them so that the crossbar and the signaling device 30 are held in upright operative position. The signaling device 30 is moved to retracted position in the same manner as in the preferred embodiment.

A third embodiment of the invention is illustrated in Figs. 9 and 10. This structure operates generally similar to the second embodiment shown in Fig. 8, but has stop members positioned differently. The frame 20 is provided with a stop member 53 in each of the side walls 22 and 23 so that, when the signaling device 30 is swung to upright position, the opposite ends of the crossbar 48 bear against the stop members 53, and the end portion 50 of the crossbar 48 passes beyond the detent 52 to firmly hold the crossbar and signaling device in upright operative position.

A fourth embodiment is illustrated in Fig. 11 in which the cooperating latching portions are formed in still a different manner than those specified in the first three structures. A crossbar 54 is provided with a well 55 in its free end portion 56. The well 55 is of a size to receive a coiled spring 57 and a ball latch 58 which is permanently retained in a conventional manner.

The free end portion 56 of the crossbar 54 is constructed to swing tangentially to the base 21 when the journal ends 42 and 43 are positioned within the journal seats 27 and 28, as shown in Fig. 11. An aperture or recess 60 is provided in the base 21 directly beneath the journal seats 27 and 28. When the signaling device 30 is swung to upright position, the journal ends 42 and 43 are pulled upwardly into the journal seats 27 and 28, and as the free end portion 56 passes over the aperture 60, the ball latch 58 snaps downwardly into the aperture 60 under the action of the coil spring 57 to releasably latch the signaling device in upright operative position.

A fifth embodiment is shown in Figs. 12 and 13. The structure and operation of this embodiment are similar to the fourth embodiment shown in Fig. 11 except for the location of the cooperating latching portions. In this embodiment, a well 61 is provided at each end of a crossbar 62 to receive a coil spring 63 and ball latch 64 in the same manner as described above. An aperture 65 is positioned in each of the upstanding side walls 22 and 23 so that when the signaling device is swung to upright position, as shown in Fig. 12, with the journal ends 42 and 43 in the journal seats 27 and 28, the ball latch 64 will automatically be urged outwardly into the apertures 65 and releasably latch the signaling device in upright operative position.

The foregoing detailed description is given for clearness of understanding only, and no unnecessary limitations are to be understood therefrom for some modifications will be obvious to those skilled in the art.

I claim:

1. A foldable warning signal, comprising: a supporting frame having a pair of upright opposed side walls, each of said side walls being provided with a similar journal slide extending longitudinally of said frame and having an upwardly disposed journal seat; a signaling device provided at one end with a transverse crossbar having journals at its opposite ends, each of said journals being slidably received in one of said journal slides to permit swinging movement of said signaling device between retracted closed position and upright open position; and cooperating latching portions acting between said frame and said transverse crossbar for holding the signaling device in upright open position, engagement of said latching portions being effected by moving said journals upwardly into said journal seats and swinging the signaling device to upright open position, said engaged latching portions maintaining said journals in said journal seats to impart stability to said signaling device in open position.

2. A foldable warning signal as specified in claim 1, in which the cooperating latching portions include a recess in the supporting frame and a movable catch in the crossbar, said catch being normally urged outwardly of said crossbar and being positioned to snap into said recess when the signaling device is swung to upright open position and the journals are in the journal seats.

3. A foldable warning signal as specified in claim 1, in which the crossbar swings through an arc rearwardly of the axis of the journals during movement of the signaling device to upright open position, and a stop member is positioned on the frame to abut said crossbar when the signaling device is in upright open position, the cooperating latching portions engaging said crossbar rearwardly of the stop member to maintain said signaling device in upright open position.

4. A foldable warning signal as specified in claim 3 in which the frame has a base joining the side walls, and the crossbar has an end portion swingable through an arc substantially tangent to said base, the stop member being positioned on the base to arrest swinging movement of the end portion of the crossbar when the signaling device is in upright open position.

5. A foldable warning signal, comprising: a supporting frame having a base and a pair of upright opposed side walls, each of said side walls being provided with a similar journal slide extending longitudinally of said frame and having a journal seat; a signaling device provided at one end with a transverse crossbar having journals at its opposite ends, each of said journals being slidably received in one of said journal slides and adapted to fit in a journal seat to permit swinging movement of said signaling device between retracted closed position and upright open position, said crossbar having an end portion swingable forwardly and downwardly as the signaling device is moved toward open position, said end portion being of a length to make an abutting contact with the base to stop the signaling device in upright open position and retain the journals positioned in the journal seats; and a latch member on the frame for releasably locking the signaling device in upright open position, said latch member being positioned rearwardly of the crossbar when said end portion and base are in abutting contact to retain said journals in the journal seats and to releasably latch the signaling device in upright open position.

6. A foldable warning signal as specified in claim 5, in which the base of the supporting frame is resiliently yieldable and the latch member is a detent struck upwardly from the base of the supporting frame, the detent yielding with the base to permit the end portion of the crossbar to snap forwardly past said detent when the signaling device is swung to upright open position whereby the crossbar is releasably retained in abutting contact with said base by the detent.

7. A foldable warning signal as specified in claim 5, in which the end portion of the crossbar is offset rearwardly of the axis of the journals so as to make abutting contact with the base of the frame rearwardly of the axis of said journals.

8. A foldable warning signal, comprising: a supporting frame having a base and a pair of upright opposed side walls, each of said side walls being provided with a similar journal slide extending longitudinally of said frame and having a journal seat; a signaling device provided with an end portion having a pair of oppositely projecting journals, each of said journals being slidably received in one of said journal slides and adapted to fit in a journal seat to afford swinging movement of said signaling device between retracted closed position and upright open position, said end portion moving forwardly and downwardly as the signaling device is swung toward open position and being of a length to make an abutting contact with the base to stop the signaling device in upright open position, the abutting contact retaining the journals in said journal seats; and a latch member on the frame for releasably locking the signaling device in upright open position, said latch member being positioned rearwardly of the end portion when said end portion and base are in abutting contact to retain said journals in the journal seats and to releasably latch the signaling device in upright open position.

References Cited in the file of this patent

UNITED STATES PATENTS

| | | |
|---|---|---|
| 2,235,282 | Carver | Mar. 18, 1941 |
| 2,235,284 | Carver | Mar. 18, 1941 |
| 2,451,875 | Ryder | Oct. 19, 1948 |
| 2,520,236 | Carver | Aug. 29, 1950 |
| 2,520,389 | Ferris | Aug. 29, 1950 |
| 2,536,177 | Harkins | Jan. 2, 1951 |
| 2,679,370 | Bolser | May 25, 1954 |
| 2,757,891 | Gunderson | Aug. 7, 1956 |